United States Patent
Miller

(10) Patent No.: US 10,337,275 B1
(45) Date of Patent: Jul. 2, 2019

(54) O-RING SEALING FOR CASING INSTALLATION SYSTEM

(71) Applicant: David M. Miller, Bakersfield, CA (US)

(72) Inventor: David M. Miller, Bakersfield, CA (US)

( * ) Notice: Subject to any disclaimer, the term of this patent is extended or adjusted under 35 U.S.C. 154(b) by 173 days.

(21) Appl. No.: 15/330,645

(22) Filed: Oct. 24, 2016

Related U.S. Application Data

(63) Continuation-in-part of application No. 13/987,729, filed on Aug. 26, 2013, now Pat. No. 9,500,054.

(51) Int. Cl.
| | |
|---|---|
| *E21B 33/04* | (2006.01) |
| *E21B 23/01* | (2006.01) |
| *F16J 15/02* | (2006.01) |
| *E21B 33/14* | (2006.01) |

(52) U.S. Cl.
CPC .............. *E21B 33/04* (2013.01); *E21B 23/01* (2013.01); *F16J 15/022* (2013.01); *E21B 33/14* (2013.01)

(58) Field of Classification Search
CPC ....................................................... E21B 33/04
See application file for complete search history.

(56) References Cited

U.S. PATENT DOCUMENTS

| | | | |
|---|---|---|---|
| 3,329,448 A | 7/1967 | Allen | |
| 3,802,509 A * | 4/1974 | Grable | E21B 33/037 166/377 |
| 3,972,546 A * | 8/1976 | Putch | E21B 33/04 166/182 |
| 4,311,194 A | 1/1982 | White | |
| 4,313,497 A * | 2/1982 | Graham | E21B 23/01 166/124 |
| 4,494,778 A | 1/1985 | Johnson | |
| 4,580,788 A | 4/1986 | Rabe et al. | |
| 4,653,589 A | 3/1987 | Alandy | |
| 4,886,121 A | 12/1989 | Demny et al. | |
| 4,928,769 A | 5/1990 | Milberger et al. | |
| 5,179,218 A | 2/1993 | Fried | |
| 5,355,961 A * | 10/1994 | Gariepy | E21B 33/04 166/182 |
| 6,019,175 A | 2/2000 | Haynes | |
| 6,662,868 B1 | 12/2003 | Bilderbeek | |
| 2005/0194555 A1 | 9/2005 | Hall | |
| 2012/0312529 A1 | 12/2012 | Ringgenberg | |

* cited by examiner

*Primary Examiner* — Giovanna C Wright
(74) *Attorney, Agent, or Firm* — Kelley & Kelley, LLP

(57) ABSTRACT

Annular sealing structure associated with at least one annular support for sealing off against well casing said sealing structure including a first O-ring and at least two spaced annular sealing surfaces against which the O-ring seals in addition to sealing off against well casing.

9 Claims, 5 Drawing Sheets

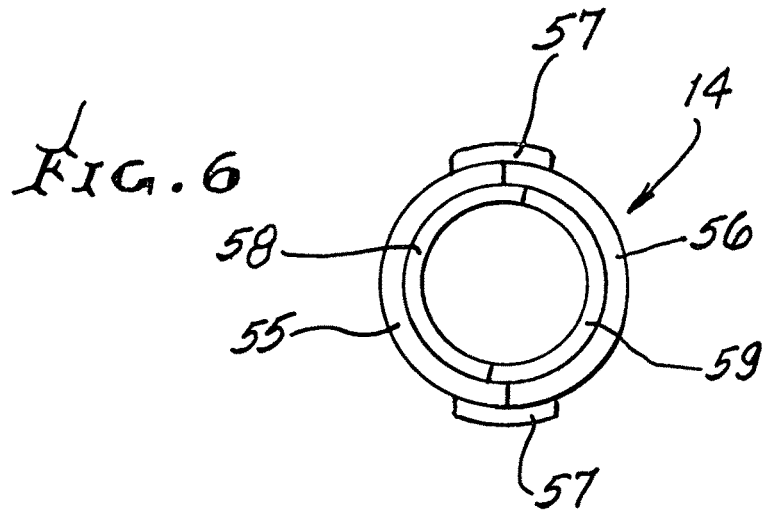
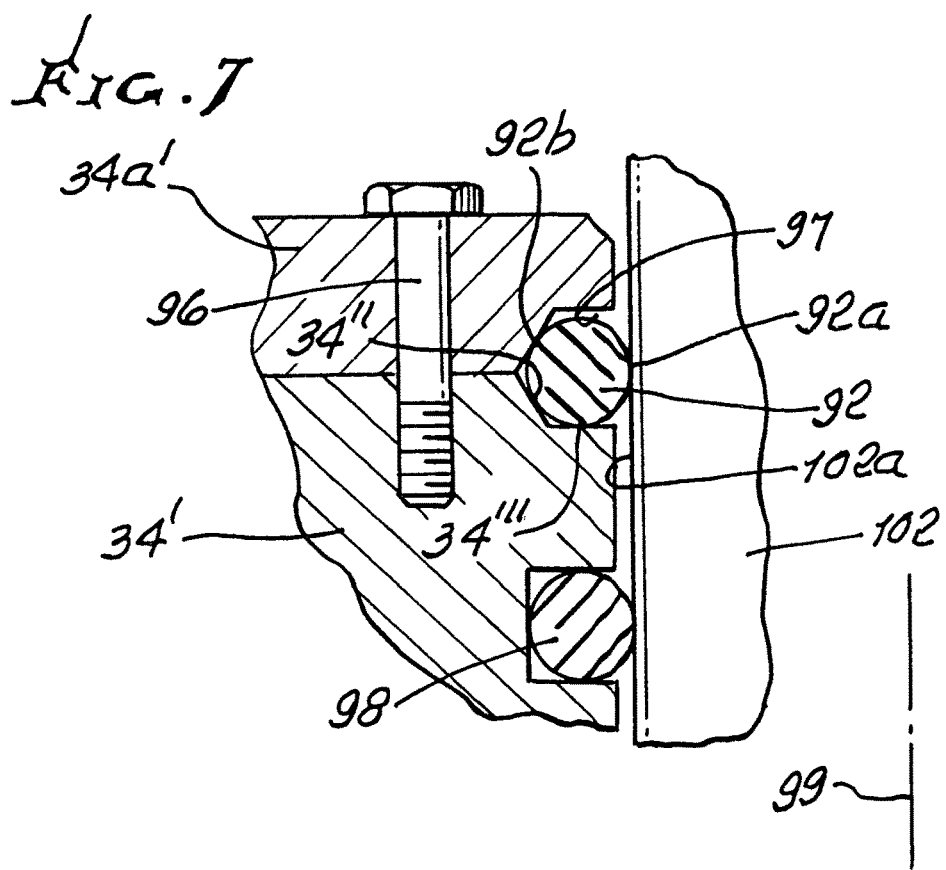

O-RING SEALING FOR CASING INSTALLATION SYSTEM

This application is a continuation-in-part of pending U.S. application Ser. No. 13/987,729, filed Aug. 26, 2013, which claims priority from U.S. application Ser. No. 12/927,572, filed Nov. 17, 2010, which claims priority from provisional application Ser. No. 61/262,912, filed Nov. 19, 2009, all of which are incorporated herein by reference.

BACKGROUND OF THE INVENTION

This invention relates generally to O-ring sealing methods and apparatus, utilized for example in the completion of hydrocarbon wells. The invention is particularly directed to methods of such O-ring use, for contributing inter alia to reducing the amount of drillrig time and associated expense associated with hanging casing or tubing within a previously installed concentric outer casing.

There is need for improvements in apparatus and method for installing casing strings in oil and gas wells, and which reduce time and cost of such installation.

SUMMARY OF THE INVENTION

The basic method of installing well head production apparatus onto well casing successively connected into position in a well, includes:

a) installing and landing multiple concentric casing strings in the well, for cementing, b) detecting unwanted weight induced downward displacement of a selected string or strings after attempted string cementing, and while landing weight is temporarily relieved and until no such downward displacement of a last installed casing string is detected, O-ring sealing of casing being employed, d) and then connecting said production apparatus to upper extent of the last installed casing string.

It is a further object of the invention to provide method and apparatus to meet sealing needs associated with the above described operations. Basically, the improved method of installing a plurality of casing sections in a well, further includes the steps:

a) providing hanger structure sized for installation at a well head, the hanger structure having a vertical through opening via which successive casing sections are installable vertically in the well, b) the hanger structure having vertically spaced shoulders for landing such casing sections, c) providing adjustable means for enabling controllable adjustment of hanger length, whereby uncemented casing weight is applied to the hanger structure, and, d) employing O-ring sealing structure in conjunction with casing installation, such structure including a first O-ring and at least two spaced annular sealing surfaces to which the O-ring seals in addition to sealing off against well casing.

As will be seen, such adjustable means typically includes wedge surfaces that induce lateral expansion of a lower portion of the hanger structure in response to adjustment of said means. Also, such shoulders are defined by annularly extending supports which are removable from said hanger structure, and adapted to pass casing sections. The annular supports, such as bowls, typically form progressively smaller inner diameters, to facilitate installation and landing of coaxial casing sections.

Another object is to provide body sections that are laterally removably away from landed casing. As will be seen, at least one body section includes detachable components removable laterally away from installed casing, at the well head. Bowl sections and their supports are also laterally removable.

A further object is to provide for enhanced O-ring sealing against well casing, as in installations described herein.

These and other objects and advantages of the invention, as well as the details of an illustrative embodiment, will be more fully understood from the following specification and drawings, in which:

DRAWING DESCRIPTION

FIG. 6 shows body section removability.

FIG. 7 shows modified O-ring sealing.

DETAILED DESCRIPTION

Figure 1:
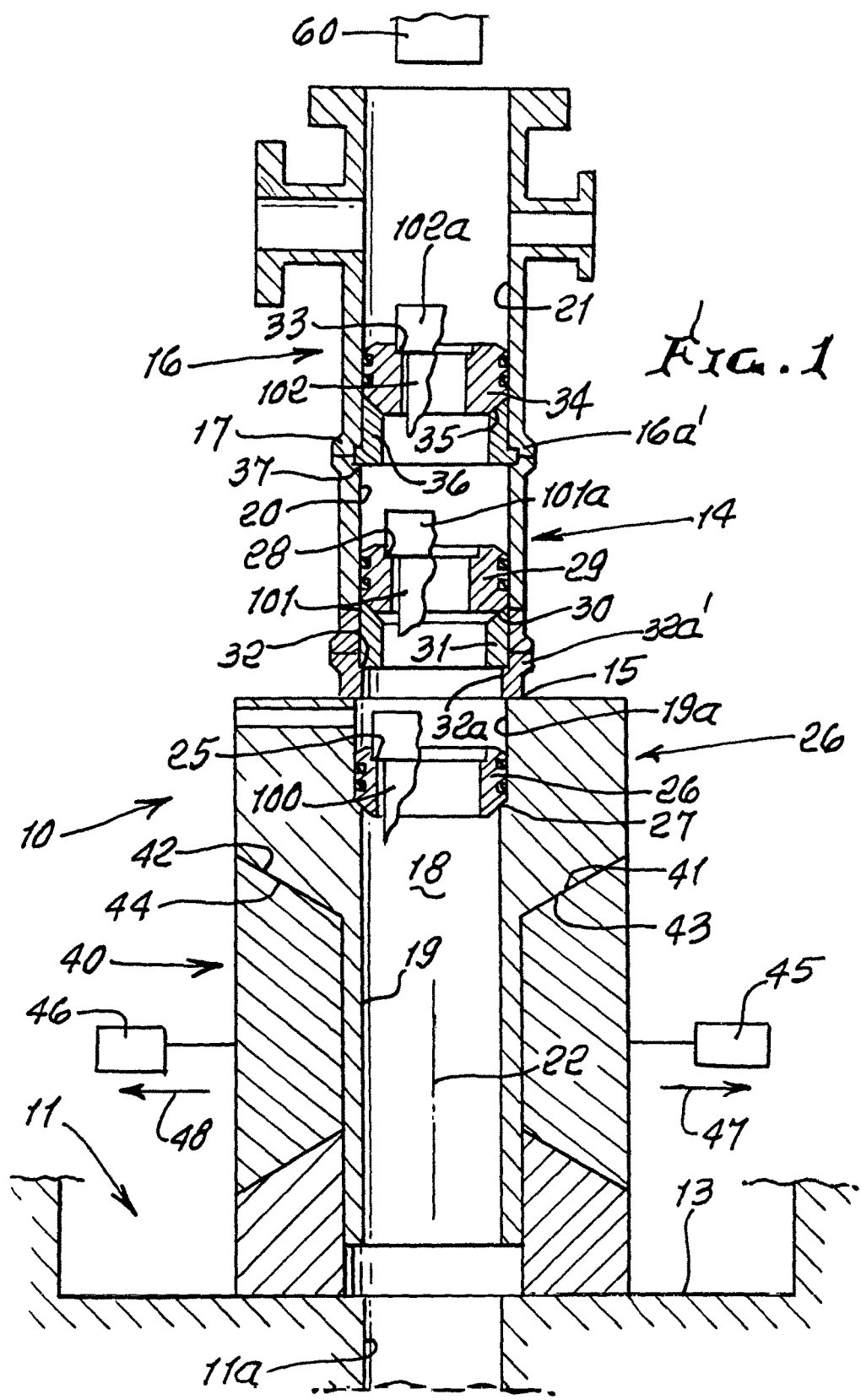
FIG. 1 is a vertical section taken through assembled structure embodying the invention.
Figure 2:
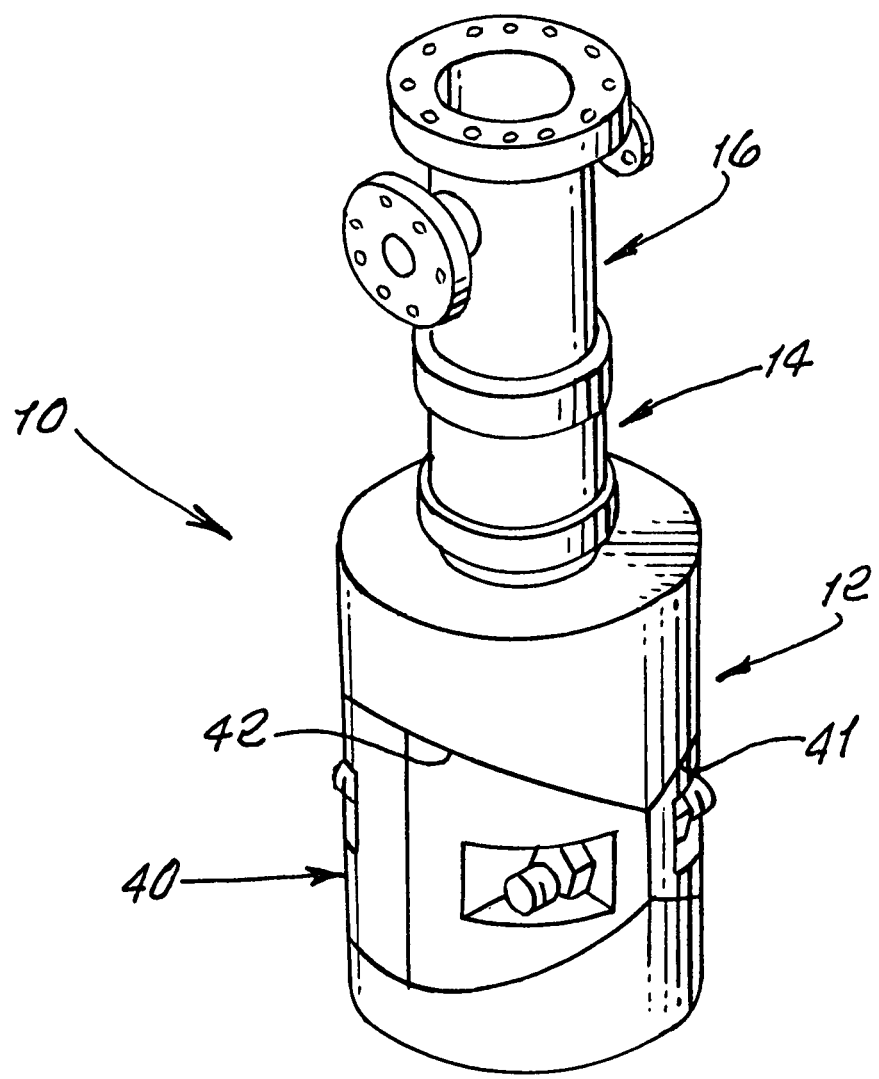
FIG. 2 is a perspective view of the FIG. 1 structure.
Figure 4:
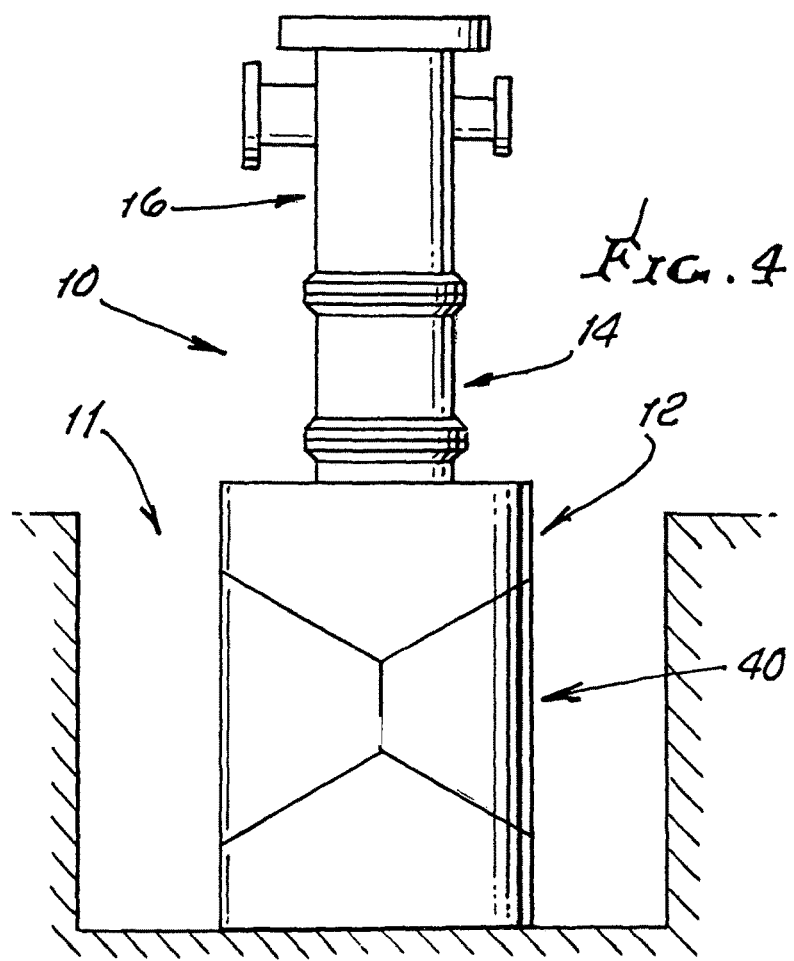

Referring first to FIG. 1, and to the FIG. 4 schematic, it shows apparatus 10 to be installed at a well site 11 to facilitate successive installation of casing string sections in the well. Such apparatus includes a lower body section 12 be installed as at surface 13, an upper body section 14 carried at 15 by section 12, and a yet further upper body section 16 carried at 17 by section 14. All such sections may be considered as casing hanger structure sections.

The sections define a vertical through opening 18, as at bores 19 and 19a in section 12; bore 20 in section 14 and bore 21 in section 16, all such bores being co-axial, i.e. with respect to common axis 22. Through opening 18 is adapted to pass casing installable vertically in the well 11a.

The hanger structure has or includes vertically spaced shoulders for landing different casing sections. For example, annular shoulder 25 to support casing 100 is defined by first annulus or bowl 26 supported at annular shoulder 27 in lower body section 12, second annular shoulder 28 to support casing 101 is defined by second annulus or bowl 29 supported at tapered annular shoulder 30 on annulus 31, which is in turn supported at 32 to structure 32a associated with body section 14; and third annular shoulder 33 to support casing 102 defined by third annulus or bowl 34 supported at tapered annular shoulder 35 on annulus 36, which in turn supported at 37 by the second or upper body section 14.

Annulus 31 interfits body structure 32a and 14, and annulus 36 interfits body structure 16a and 16 aiding stabilization of the assembled body section.

In this regard, the second bowl 29 and its support 31 are downwardly installed in the bore via hanger body sections 16 and 14 after casing 100 is installed downwardly; and the third bowl 34 and annular 36 are installed after casing 101 is installed downwardly into landed position.

Adjustable means is provided for enabling controllable adjustment of hanger length, whereby uncemented casing weight is applied on the hanger structure.

As shown in FIG. 1, the adjustable means 40 includes interengaged wedge surfaces 41 and 42 engaging wedge surfaces 43 an 44 on body 12, and schematically shown actuators 45 and 46 operable to move surfaces 41 and 42 in opposite directions 47 and 48 away from the shoulders 43 and 44 of section 12. If section 12 then drops, along with sections 14 and 16, it indicates that cementing of casing 100 supported at 27 is not completed.

A second string of casing 101 is then run into the well, and through casing 100, and landed at 28. Cementing is then continued through the two casings. when cementing is completed, the wedge surfaces 41 and 42 are moved further away from surfaces 43 and 44. If the casing drops 100, along with casing 101 and body sections 12, 14 and 16 it means that such second attempted cementing is not completed or effective. A third string of casing 102 is then run into the well, and through both casings 100 and 101. Cementing is then continued through the three casings, until successful. Well producing apparatus is then connected onto the projecting head 102a of the successively cemented casing 102 after body sections 14 and 16 are removed, laterally, to expose casing head 102a. If casing 101 had been successfully cemented, the wall producing apparatus could be connected to head 101.

Figure 3:
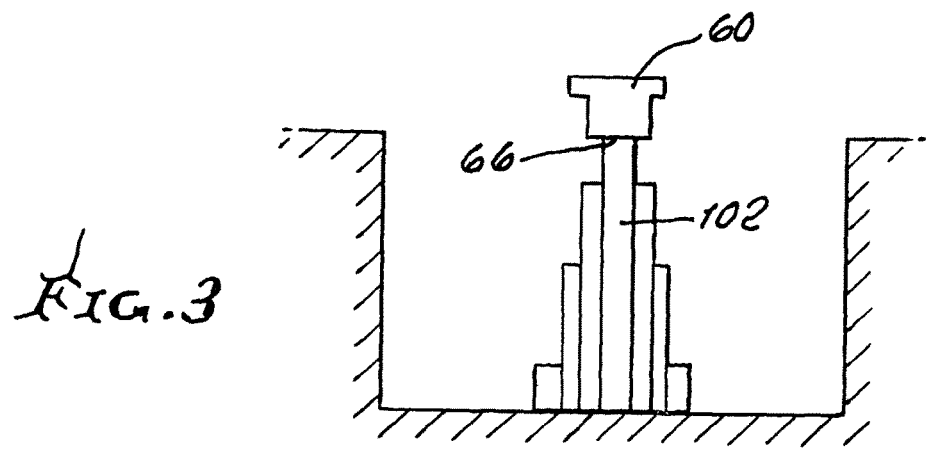
FIGS. 3 and 4 are schematic views of completed installation.

After the casing string or strings have been run into position, and the last string successfully cemented, the upper body sections 14 and 16 are removed, laterally away from the casing. To enable this, sections 14 and 16 may be split to each include detachable components 55 and 56, as shown in FIG. 6, connected as by latches 57, or by flange connections on the body sections, facilitating lateral removal of such components as well as sections 58 and 59 of the bowls and of bowl support sections respectively shown at 31 and 36. The latter may also include sections removable laterally away from the casing, with the components 55 and 56. This enables rapid access of well production equipment 60 to the casing head or heads seen in FIG. 3, and particularly to the casing that produces well fluid (oil, gas, etc.) See FIG. 3 installation, with production connection 66 welded in position after removal of body sections 14 and 16.

Accordingly, the method of installing well head production apparatus onto well casing successively connected into position in a well, basically includes:
 a) installing and landing multiple concentric casing strings in the well, for cementing,
 b) detecting unwanted weight induced downward displacement of at least one and preferably multiple casing strings after attempted string cementing, and while such landing is temporarily relieved, and until no such downward displacement of a last installed casing string is detected,
 a) and then connecting said production apparatus to upper extent of said last installed casing string.

As will be seen, step b) typically comprises detecting unwanted weight induced downward displacement of multiple of the casing strings after attempted string cementing. Such multiple strings typically include three strings installed before cementing.

Also, latches may be provided to hold the body sections in position to support the bowls. The body sections are outwardly removable to facility attachment of well production equipment to the last installed casing string. Body section flanges may be used instead of latches and may be disconnected to enable section removal. See flanges 16a and 16a', and 32a and 32a'.

Figure 5:
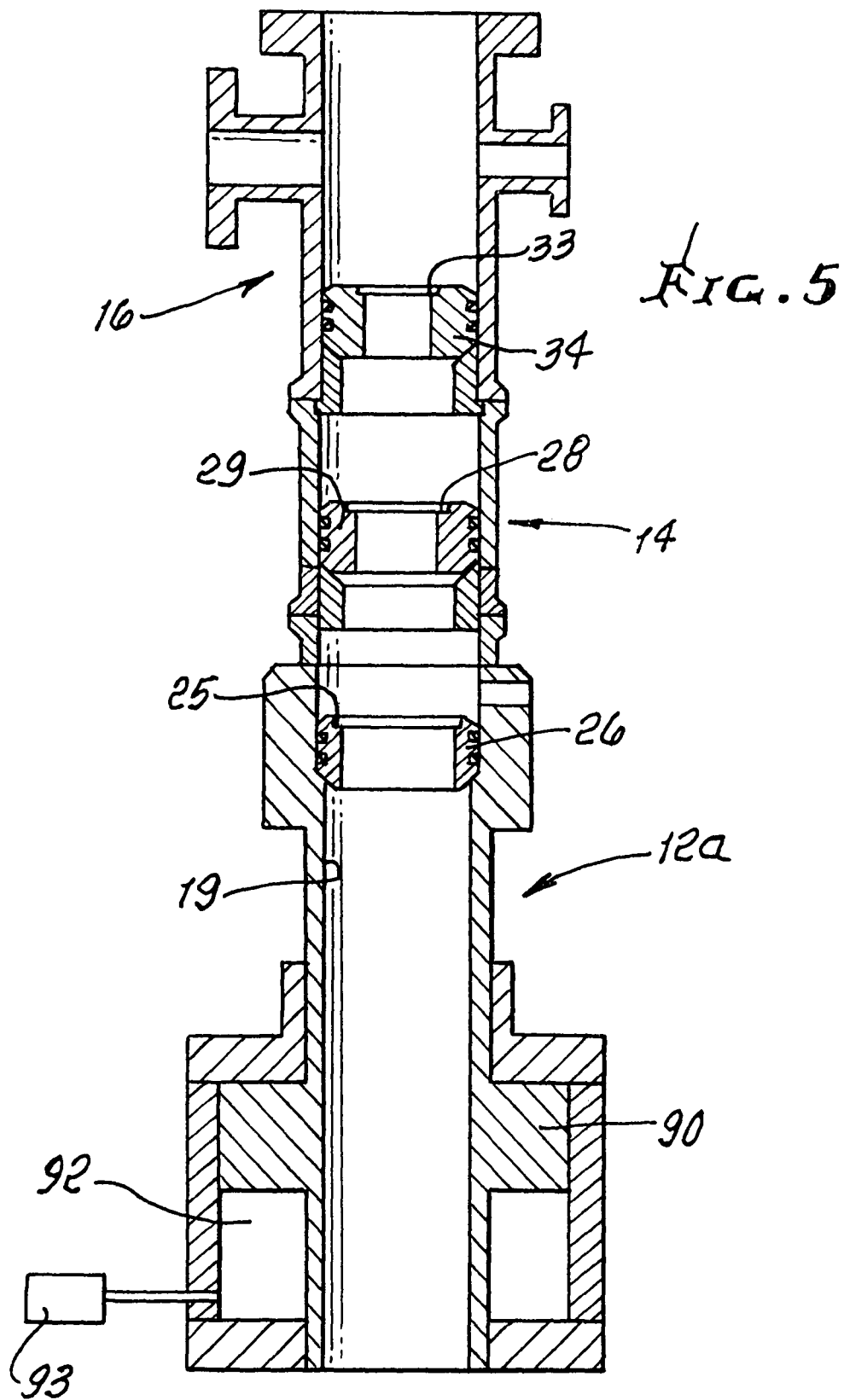
FIG. 5 shows a modification.

In the modification shown in FIG. 5, the modified lower body section 12a has a lower extension 90 in the form of a piston, movable downwardly in cylinder 19 of uncemented casing weight is applied to bowl 26. Resistance to piston downward travel, as by fluid pressure at 92 in the cylinder, is controlled as at 93.

FIG. 7 shows a modified bowl such as bowl 34' incorporating annular sealing structure for sealing off against the surface of casing, such as casing surface 102a. Such structure includes an elastomeric O-ring 92 extending about the casing and sealing at 92a against the casing surface.

The sealing structure also includes O-ring annular retention surfaces 34" and 34'" formed by bowl 34' serving to pressurize and seal against the O-ring for enhancing its sealing at 92a against the casing surface 102a.

A holder in the form of extension 34a' of 34' overlies 34' and is adjustably bolted at 96 to 34'. That extension adjustably downwardly pressurizes and seals against the upper angular side, at 92b of the O-ring, additionally enhancing effective and adjustable sealing against the casing at 92a, as referred to. Also, space 97 is created above the O-ring to allow pressure to deform the O-ring, pushing it down in space 97 as well. The angular surface at 34" also acts similarly. The pressurizing surface angles at 92b and 34" typically are between 35° and 55° in planes containing the O-ring axis 99.

Accordingly, an O-ring with multiple annular sealing surfaces is provided, corresponding to the pressurizing annular surfaces. A second O-ring 98 is is spaced co-axially from O-ring 92. See O-ring axis 99.

As will be seen, the method of pressurizing the O-ring to provide enhanced sealing against the work surface of the casing, includes the following steps, in relation to the O-ring axis
 a) providing multiple spaced apart pressurizing and relatively angled surfaces that extend annularly about the O-ring axis, and about the work,
 b) and relatively displacing at least two of said surfaces spaced apart lengthwise of said axis to annularly engage the O-ring at different angles, thereby deforming the O-ring as it seals against the work.

The method enables provision of space adjacent at least one of such surfaces to receive O-ring deformation adjacent the work. The O-ring is resiliently deformable, for example elastomeric.

I claim:

1. An annular sealing structure associated with at least one annular support for sealing off against a well casing, said sealing structure comprising:
 a first O-ring and at least two spaced annular sealing surfaces against which the O-ring seals in addition to sealing off against the well casing; and
 a holder connected to said sealing structure, said holder having a third annular surface spaced from said two spaced annular sealing surfaces, wherein said third annular surface extends at an angle in a plane containing the O-ring and is configured to compress the O-ring against the well casing and also against said sealing surfaces.

2. The sealing structure of claim 1 wherein at least one of said annular sealing surfaces extends at an angle between about 35° and 55° in planes containing an O-ring central axis, defined by the first O-ring.

3. The sealing structure of claim 2 wherein the sealing structure includes a second O-ring located co-axially with said central axis defined by the first O-ring.

4. The sealing structure of claim 1 wherein there are multiple of said sealing structures spaced lengthwise along the well casing.

5. A method for pressurizing a plurality of O-rings to provide enhanced sealing against a work surface, comprising the steps of:
 a) providing a first O-ring and a second O-ring spaced co-axially from the first O-ring along a central axis thereof;

b) providing multiple, spaced-apart, pressurizing, and relatively angled surfaces that extend annularly about the central axis of said first O-ring, and about the work surface;
c) compressing the first O-ring against the work surface and the multiple, spaced-apart, pressurizing, and relatively angled surfaces by advancing an additional angled surface against the first O-ring; and
d) relatively displacing at least two of said multiple, spaced-apart, pressurizing, and relatively angled surfaces spaced apart lengthwise of said central axis to annularly engage the first O-ring at different angles, thereby deforming the first O-ring as the first O-ring seals against the work surface.

6. The method of claim 5 including simultaneously providing space adjacent at least one of said surfaces to receive O-ring deformation.

7. The method of claim 5 including providing said work surface in the form of a well casing.

8. The method of claim 5 includes providing a bowl sealing against the first O-ring for enhancing O-ring sealing against a casing surface.

9. The method of claim 5 wherein the first O-ring is elastomeric.

* * * * *